United States Patent [19]

Bowes

[11] Patent Number: 5,162,081

[45] Date of Patent: Nov. 10, 1992

[54] MULTIPLE-PRESSURE DISTILLATION

[75] Inventor: H. David Bowes, Erie, Pa.

[73] Assignee: Finish Thompson Inc., Erie, Pa.

[21] Appl. No.: 725,984

[22] Filed: Jul. 5, 1991

[51] Int. Cl.$^5$ ............................................. B01D 3/00
[52] U.S. Cl. .............................. 203/2; 203/18; 203/91; 203/DIG. 11; 568/868
[58] Field of Search ...... 203/1, 3, DIG. 18, DIG. 11, 203/18, 88, 91, 2, DIG. 14; 568/868; 159/47.1, 2.1

[56] References Cited

U.S. PATENT DOCUMENTS

| | | | |
|---|---|---|---|
| 2,159,621 | 5/1939 | Van Dijck | 203/DIG. 11 |
| 3,450,603 | 6/1969 | Meyers et al. | 203/18 |
| 3,875,019 | 4/1975 | Cocuzza et al. | 203/18 |
| 4,010,065 | 3/1977 | Alleman | 203/18 |
| 4,182,659 | 1/1980 | Anwer et al. | 203/18 |
| 4,225,394 | 9/1980 | Coxo et al. | 203/18 |
| 4,322,265 | 3/1982 | Wood | 203/18 |
| 4,390,398 | 6/1983 | Coker et al. | 203/18 |
| 4,401,512 | 8/1983 | Likens, Jr. | 203/DIG. 11 |

Primary Examiner—Virginia Manoharan
Attorney, Agent, or Firm—Webb, Burden, Ziesenheim & Webb

[57] ABSTRACT

A method for distillation of a multiple-component liquid/solid system, for example, used engine coolant at two different vaporizing pressures. One component, for example, water, is separated into one distillate stream at a first pressure and the other component, for example, ethylene glycol, is separated into another distillate stream at a second pressure. Each distillate stream is directed toward an individual storage tank.

6 Claims, 2 Drawing Sheets

MULTIPLE-PRESSURE DISTILLATION

BACKGROUND OF THE INVENTION

This invention relates to distillation equipment and to a process in which used automotive engine coolant may be effectively and economically distilled and then reused.

It is both environmentally and economically desirable to be able to reuse engine coolant. Old engine coolant contains contaminants that have damaging effects on the engine cooling system. Therefore, car manufacturers recommend the replacement of engine coolant at regular intervals. Engine coolant cannot be poured into the sewer because of its toxic nature. It must either be properly disposed or recycled. Some garages remove coolant, filter it, add "makeup" ethylene glycol and additional chemical inhibitors and return this coolant to service. Unfortunately, this is not a satisfactory procedure. The filtration does not remove nearly enough of the contaminants and since the coolant may have become diluted, some must be disposed of in the process of increasing the concentration of the coolant with fresh ethylene glycol or the like.

Distillation is a process which separates various compounds from a mixture by selective vaporization and condensation. The result is that the recovered compounds may be very pure. The temperature and pressure at which the vaporization takes place, as well as the composition of the mixture, controls composition of the vapor being removed from the mixture and the rate at which vaporization takes place.

Used engine coolant comprises two major components; namely, water and ethylene glycol. The remaining components, such as rust inhibitors, salts, silicates, metals and other undesirable contaminates are a very small but often very detrimental part of the overall volume.

SUMMARY OF THE INVENTION

An important object of the present invention is to provide a process which recovers a rich (high and very pure) concentration of ethylene glycol from used engine coolant enabling its reuse to make new engine coolant. The two major components of used engine coolant are separated from each other and from the other components. Substantially pure water is captured in one container and substantially pure ethylene glycol is captured in another container. This allows the water to be disposed of legally or to be reused and the ethylene glycol to be reused. The residue of contaminates has a far smaller volume than the original amount of processed coolant. That makes disposal of the residue far less costly.

Another object of this invention is to provide a process which recovers substantially pure water, say 98% pure, from used engine coolant and only a small volume of contaminant residue.

An important advantage of the method according to this invention is that it may be conducted automatically.

It is an advantage according to this invention to provide a combination two-pressure still as one simple assembly for separating two volatile liquids that can be manufactured from relatively inexpensive standard components.

Briefly, according to this invention, there is provided a batch process for separating a multiple-component solution and/or mixture comprising a more volatile liquid, less volatile liquid and substantially nonvolatile liquid and/or solid contaminants. The more volatile liquid may be water and the less volatile liquid may be ethylene glycol as found in used engine coolant. The substantial nonvolatile liquid and/or solids may be the contaminants in used engine coolant. The process comprises a first step of placing the mixture in a heated vacuum vessel. The mixture is then heated to a preselected temperature at a first pressure equal to or greater than atmospheric pressure to vaporize the more volatile liquid which is condensed and directed to a container. Next, the mixture is further heated to a preselected temperature at a second pressure less than atmospheric pressure to vaporize the less volatile liquid which is condensed and directed to a container. Preferably, the two condensed liquids are directed to separate containers. Thereafter, heating is discontinued while the residue in the vessel is still flowable, and the residue is drained from the vessel.

Preferably, the conversion to the said second pressure is automatic in response to a sensed condition of the vessel which may be a temperature on or within the vessel. The first pressure is selected to allow one substantially pure compound to be vaporized and isolated from the solution and the second pressure is selected to allow a different substantially pure compound to be vaporized and isolated from the solution. The first pressure may be atmospheric pressure and the second pressure a partial vacuum in the case of the processing of used engine coolant.

There is further provided according to this invention a still including a boiling chamber with an inlet for a solution to be added and an outlet for the vapors to escape, a heater to supply the necessary heat to vaporize the solution, a condenser to convert the vapors to a liquid and apparatus for placing the boiling chamber at one of two pressures. The apparatus for placing the boiling chamber at one of two pressures may comprise a pump and aspirator to create a partial vacuum as one of the said pressures. The condenser may comprise a cooling coil which will cool the distilled compounds therein. The still may have a bottom drain for removing the remaining residue and nondistilled solution. Most preferably, the still comprises an automated means for the conversion to a second pressure in response to a sensed condition of the vessel. The sensed condition may be temperature. Most preferably, the still comprises automated means for stopping the distillation process in response to a sensed condition in the vessel. The sensed condition may be the liquid level of the remaining compound inside the boiling chamber.

BRIEF DESCRIPTION OF THE DRAWINGS

Further features and other objects and advantages will become clear from the following detailed description made with reference to the drawings in which.

DESCRIPTION OF A PREFERRED EMBODIMENT

Figure 1:
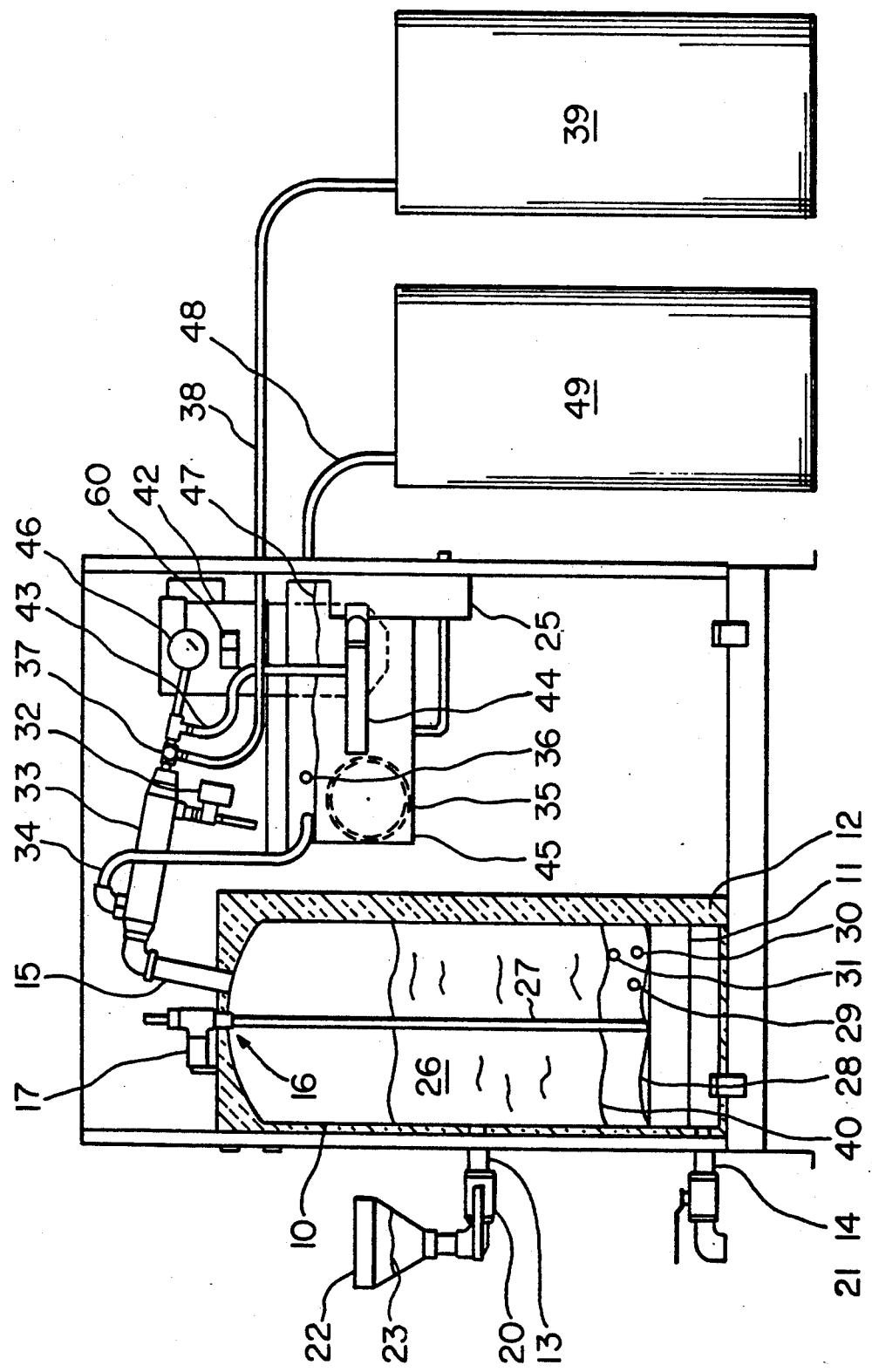
FIG. 1 illustrates the physical apparatus according to this invention.

The basic components of the engine coolant distiller are depicted in FIG. 1. A boiling chamber 10 is filled with used engine coolant 26 at the start of the distillation process. The walls of the boiling chamber may be mild steel. A 3,000 watt electrical strip heater 11 is located near the bottom and on the outside of the boiling chamber 10. Strip heater 11 is used to supply the heat required to vaporize the used engine coolant. The strip heater 11 and the boiling chamber 10 are encased with a heat insulating layer 12, which minimizes the heat loss from the assembly. Four openings in the boiling chamber 10 are provided to allow the used engine coolant to enter the chamber, to allow the residue to be drained from the chamber, to allow the vapors from boiling to escape the chamber and to allow a pressure relief safety outlet. The first opening 13 is at the intersection of the engine coolant inlet pipe nipple and the boiling chamber 10. The second opening 14 is at the intersection of the drain pipe nipple and the boiling chamber 10. The third opening 15 is at the intersection of the vapor outlet pipe nipple and the boiling chamber 10. (The diameter of this opening or a restrictor in the vapor outlet nipple should be minimized to eliminate a "burp" or rush when a vacuum is first applied.) The fourth opening 16 is located at the intersection of the pressure relief valve 17 and the boiling chamber 10. All intersections with the boiling chamber and the components described are sealed vapor tight.

A manually operated ball valve 20 is opened prior to adding used engine coolant to the system for processing and the outlet ball valve 21 is verified to be in the closed position. Used engine coolant is poured into funnel 22 and flows through a pipe nipple, pipe elbow, ball valve 20, an inlet pipe nipple and into the boiling chamber 10. An indicator mark 23 is located within funnel 22 to indicate to the operator that the correct amount of used engine coolant has been added to the system. After the correct amount of used engine coolant has been added, ball valve 20 is manually closed to prevent vapors from escaping through the inlet pipes and funnel during the distillation process.

Figure 2:
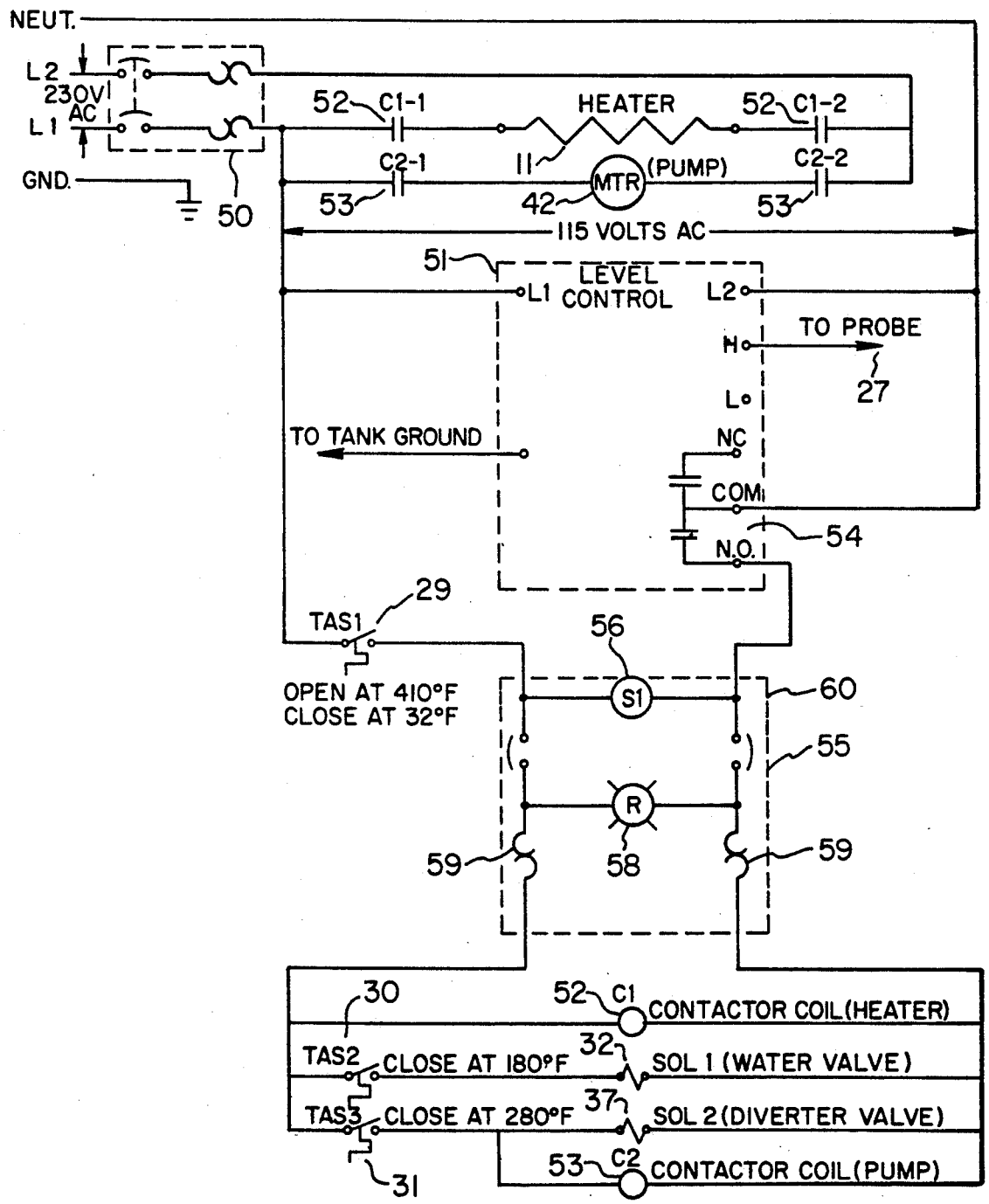
FIG. 2 is a circuit diagram illustrating the control of the apparatus according to this invention.

Referring to FIG. 2, 230 volt power with two phase lines L1 and L2 along with a neutral line for the 115 volt control circuit and a ground wire are supplied to the engine coolant distillation unit through circuit breaker 50. Level control 51, contactor (heater) 52 and contactor (pump) 53 are located inside electrical enclosure 25 as shown in FIG. 1. When the boiling chamber is filled with the proper amount of used engine coolant 26, the level of used engine coolant within the boiling chamber is above the bottom of the level sensor probe 27, as noted by level 28. When there is continuity between the level probe 27, the used engine coolant and the boiling chamber, level control relay 54 will close, which completes the circuit to the ON-OFF switch 55. ON-OFF switch 55 is toggled to the ON position to start the distillation process. ON-OFF switch 55 has three functions other than manually switching the unit on or off. A solenoid 56 is located within the switch which automatically toggles the switch off if either L1 or the neutral circuit are broken. The L1 line will only be broken if the circuit breaker 50 trips or if the high temperature safety thermostat 29 opens, indicating a problem with the level control and probe assembly. The neutral line will only be broken if circuit breaker 50 trips or if the level of used engine coolant in the boiling chamber drops below probe 27 which in turn causes the level control 41 to open the relay contacts 54. Level sensor probe 27 and level control 51 are commercially available, such as Warrick Controls #3H1B34. An indicator light 58 provides a visual display that power is supplied to the switch and it is in the ON position. Circuit breakers 59 are supplied for protection of the control circuit. One such manufacture of an ON-OFF switch as described is ETA, part number 3120-F321-H7T1-R14XB3-X3120-N02BM.

As soon as the ON-OFF switch 55 has been toggled on, the electrical circuit to contactor coil 52 is made and the associated contacts close which allows the heater to be energized and begin the heating process. Both thermostats 30 and 31 remain open until the boiling chamber tank temperature reaches their respective activation temperatures. When the tank temperature reaches 180° F., thermostat 30 will close. This completes the electrical circuit to the water valve solenoid 32, which opens and allows tap water to flow through condenser 33, exit out of the condenser through line 34, flow through ethylene glycol tank cooling coil 35 and exit to a drain through outlet 36. Boiling will not take place inside the boiling chamber until the tank temperature approaches 200° F., consequently there is no need for water to flow through the condenser or the tank cooling coil until the temperature reaches approximately 180° F.

Referring to FIG. 1, the water dissolved in the used engine coolant will be the first substance to vaporize at atmospheric pressure. The tank temperature will remain at 200°-220° F. while the water is vaporizing, since most of the energy from the heater 11 is being used to convert the water from a liquid to a vapor. The water vapors collect above the liquid level inside the boiling chamber 10 and escape through the vapor outlet 15. From the vapor outlet 15, they proceed to the condenser 33. As the water vapors pass through the tubes inside the shell condenser 33, they are cooled by the tap water flowing over the tubes. This cooling process which takes place in the condenser 33 causes the water vapors to condense into a liquid by the time it reaches the condenser outlet. The condensed water flows through the solenoid controlled three-way valve 37 and is directed through the processed water line 38 and into the water storage container 39. As this process continues, the amount of water remaining in the used engine coolant diminishes. The heat rate requirement diminishes because rate of water vaporization decreases. This means less energy for vaporization is required. Consequently, the temperature of the boiling chamber begins to rise, from the 200°-220° F. range.

When the boiling chamber tank temperature reaches 280° F. at the divert thermostat 31, most of the water has been evaporated from the used engine coolant solution. The level of used engine coolant in boiling chamber 10 will have dropped to a level approximately as shown by line 40 in FIG. 1. The level will vary, depending upon the concentration of ethylene glycol and water in the used engine coolant. Referring once again to FIG. 2, when the temperature just described reaches 280° F., the divert thermostat 31 closes. This completes the circuit to the three-way divert solenoid 37 and contactor coil 53, which closes the associated contacts and completes the circuit to the pump 42 allowing it to run.

Referring to FIG. 1, the three-way divert solenoid 37 allows fluid flow from condenser 33 through vacuum line 43 and into aspirator 44, located on the outlet of pump 42. Pump 42 is located within the ethylene glycol collection tank 45. When pump 42 is running, ethylene glycol is drawn in from the bottom and circulated through aspirator 44. Aspirator 44 has a venturi which creates a pressure drop in vacuum line 43 when ethylene glycol passes through the venturi. The pressure drop created reaches a vacuum of approximately 25 inches of mercury, as measured on vacuum gauge 46. Ethylene glycol is circulated in tank 45 to achieve the vacuum described. As ethylene glycol is collected in tank 45, the level 47 rises to the point where the ethylene glycol flows through the overflow tube 48 and into the ethylene glycol storage container 49. It must be noted that the ethylene glycol collection tank 45 must always be full for the pump to function as described. It is necessary to prime (fill) the tank with approximately 5 US gallons of pure ethylene glycol if the tank is empty. Under normal operation, that would only be required at start-up. Ethylene glycol is intended to be left in collection tank 45 between processing batches, such that priming is not necessary every time. Should it become necessary to drain the collection tank 45, a drain line is supplied. Because two separate distillation outlets are utilized, one which the water will exit when it is being distilled and the other which the ethylene glycol will exit when it is being distilled, water can be collected in one container and the ethylene glycol collected in a separate container without operator assistance.

Pure ethylene glycol evaporates at approximately 280° F. while under a vacuum of 25 inches of mercury. Attempting to boil the ethylene glycol at atmospheric pressure would require the temperature to be approximately 380° F. At 380° F., additives within the used engine coolant solution would burn, causing acids to form and discoloration in the processed ethylene glycol. As stated previously, having the entire boiling chamber 10 under vacuum allows the boiling point for ethylene glycol to be reduced to 280° F. or less, which eliminates the undesirable effects of boiling at a higher temperature.

The distillation process continues until the level of used engine coolant in boiling chamber 10 drops below the liquid level sensor probe 27 as illustrated by line 28. A probe could alternately be placed in a pipe between the inlet 13 and outlet 14. Fifteen gallons of engine coolant can be processed in 12 to 13 hours with the 3,000 watt strip heater and approximately 30-40 gallons per hour of tap water for cooling the condenser.

Referring to FIG. 2, continuity between the probe and the tank is broken and level control 51 opens relay contact 54. That in turn cuts power to solenoid 56 in switch 60 and automatically switches the ON-OFF switch to the OFF position. When indicator light 58 inside the switch goes off, contactor coils 52 and 53 no longer have power, consequently, the associated contacts open causing the heater and pump to be in the OFF state. This completes one normal operating cycle. Approximately three US gallons of used engine coolant remain in the bottom of boiling chamber 10. Through testing, it has been determined that the remaining engine coolant can be left inside the boiling chamber for five consecutive distillation cycles before the contamination level is considered too high and will cause contaminates to carry over into the distilled ethylene glycol solution. This allows used engine coolant, considered waste material, to be reduced from approximately 75 US gallons to approximately 3 US gallons. Draining boiling chamber 10 is accomplished by placing a drain pan under the outlet pipe elbow and opening ball hand valve 21. The waste material flows from boiling chamber 10 through opening 14, through ball hand valve 21, through the outlet pipe elbow and into the drain pan. After all of the waste has drained, ball hand valve 21 is returned to the closed position.

The contaminants in a sample of (a) dirty coolant, (b) the same coolant filtered according to prior art filtering processes and (c) distilled according to the process of with the use of the apparatus according to this invention are set forth in the following table. The substantial advantages of this invention are apparent.

TABLE 1

| Component | Dirty Coolant | Filtered Coolant* | Distilled Coolant* |
|---|---|---|---|
| Sodium (Na) | 1880 ppm | 1770 ppm | 0.1 ppm |
| Potassium (K) | 880 ppm | 820 ppm | 0.1 ppm |
| Phosphorus (P) | 370 ppm | 370 ppm | 1 ppm |
| Chloride (Cl) | 100 ppm | 140 ppm | 3 ppm |
| Sulfate (SO3) | 260 ppm | 250 ppm | 5 ppm |
| Nitrate (NO3) | 10 ppm | 10 ppm | 2 ppm |
| Iron (Fe) | 4.0 ppm | 15 ppm | 0.5 ppm |
| Aluminum (Al) | 2.5 ppm | 3.7 ppm | 1 ppm |
| Copper (Cu) | 5.3 ppm | 4.8 ppm | 0.6 ppm |

*Before adding corrosion inhibitors.

The process of reclaiming used engine coolant has a significant environmental impact. First, recycling the ethylene glycol to a usable state again reduces the energy and expense required to produce the same amount from scratch. Second, used engine coolant is being considered a hazardous waste material and must be disposed of accordingly. Reclaiming the water and ethylene glycol from used engine coolant significantly reduces the amount (volume) of hazardous waste material to be disposed.

The method according to this invention for recycling the used engine coolant is simple in nature and is very affordable for small processors to use. This invention yields a high commercial value due to the quick payback on the processor's initial equipment investment, typically in the range of six months to two years.

The distilled water has been processed sufficiently through the distillation process to be safely disposed by dumping in the sewer. The ethylene glycol has been processed sufficiently through the distillation process to be reused in making a new engine coolant mixture. The contaminates left behind from the distillation process are drained from the distillation vessel and then disposed of in the required manner. Because the ethylene glycol is vaporized at a temperature lower than that required at atmospheric pressure, other contaminates in the engine coolant do not burn and form acids.

The still described is relatively inexpensive to construct. The boiling vessel need not be provided with a large sealed opening that needs to be unsealed and resealed. All openings to the vessel are through conduits that can be controlled by simple ball valves or the like. This results in an extremely economical construction. Further, the aspirator pump for pulling a vacuum is an inexpensive yet effective device for drawing a vacuum on the vessel during removal of the less volatile liquid. Moreover, the use of the simple temperature and level sensors and relays to control the distillation process reduces the cost of the control components.

Having thus described my invention with the detail and particularity required by the Patent Laws, what is desired protected by Letters Patent is set forth in the following claims.

I claim:

1. A batch process for separating a multiple-component solution comprising used engine coolant consisting of a mixture of water, glycols and substantially nonvolatile components so that the used engine coolant may be recycled, the process comprising the steps for:
  a) placing the mixture in a single heated vessel,
  b) heating the mixture to a first temperature at a first pressure equal to or greater than atmospheric pressure to vaporize the water, condensing and directing the water to a container,
  c) sensing a physical condition indicative of the fact the water has substantially entirely vaporized,
  d) in response to said sensed condition automatically heating the mixture to a second temperature and at a second pressure less than atmospheric pressure to vaporize the glycols, said second temperature and second pressure selected to prevent the formation of acids and the discoloration of the glycol, condensing and directing the condensed glycols to a container,
  e) automatically discontinuing heating while the residue in the vessel is still flowable, and
  f) draining the flowable residue from the vessel.

2. A batch process for separating a multiple-component solution comprising used engine coolant consisting of a mixture of water, glycols and substantially nonvolatile components so that the used engine coolant may be recycled, the process comprising the steps for:
  a) placing the mixture in a single heated vessel,
  b) heating the mixture to a first temperature between 200°–220° F. at a first pressure equal to or greater than atmospheric pressure to vaporize the water, condensing and directing the condensed water to a first container,
  c) sensing a physical condition indicative of the fact the water has substantially entirely vaporized,
  d) in response to said sensed condition automatically heating the mixture to a second temperature less than 280° F. at a second pressure less than atmospheric pressure to vaporize the glycols, condensing and directing the glycols to a second container,
  e) automatically discontinuing heating while the residue in the vessel is still flowable, and
  f) draining the flowable residue from the vessel.

3. The process as claimed in claims 1 or 2, in which the sensed condition is a rise in temperature on or within the vessel.

4. The process as claimed in claim 2, in which a single condenser is sued to cool the vapors and a diversion device is positioned after the condenser to direct the condensed liquids to the first or second container.

5. The process according to claim 4, in which the diversion device is responsive to the sensed condition indicative of the fact the water has substantially entirely vaporized for automatically directing the condensed liquids to the first or second container.

6. The process according to claims 1 or 2 wherein condensed glycols in the container to which they were directed are pumped through a conduit which recirculates the glycols to the container, and after first condensing, the glycols are directed to said conduit to be aspirated thereinto thus pulling a vacuum upon the heated vessel.

* * * * *